Patented Apr. 23, 1935

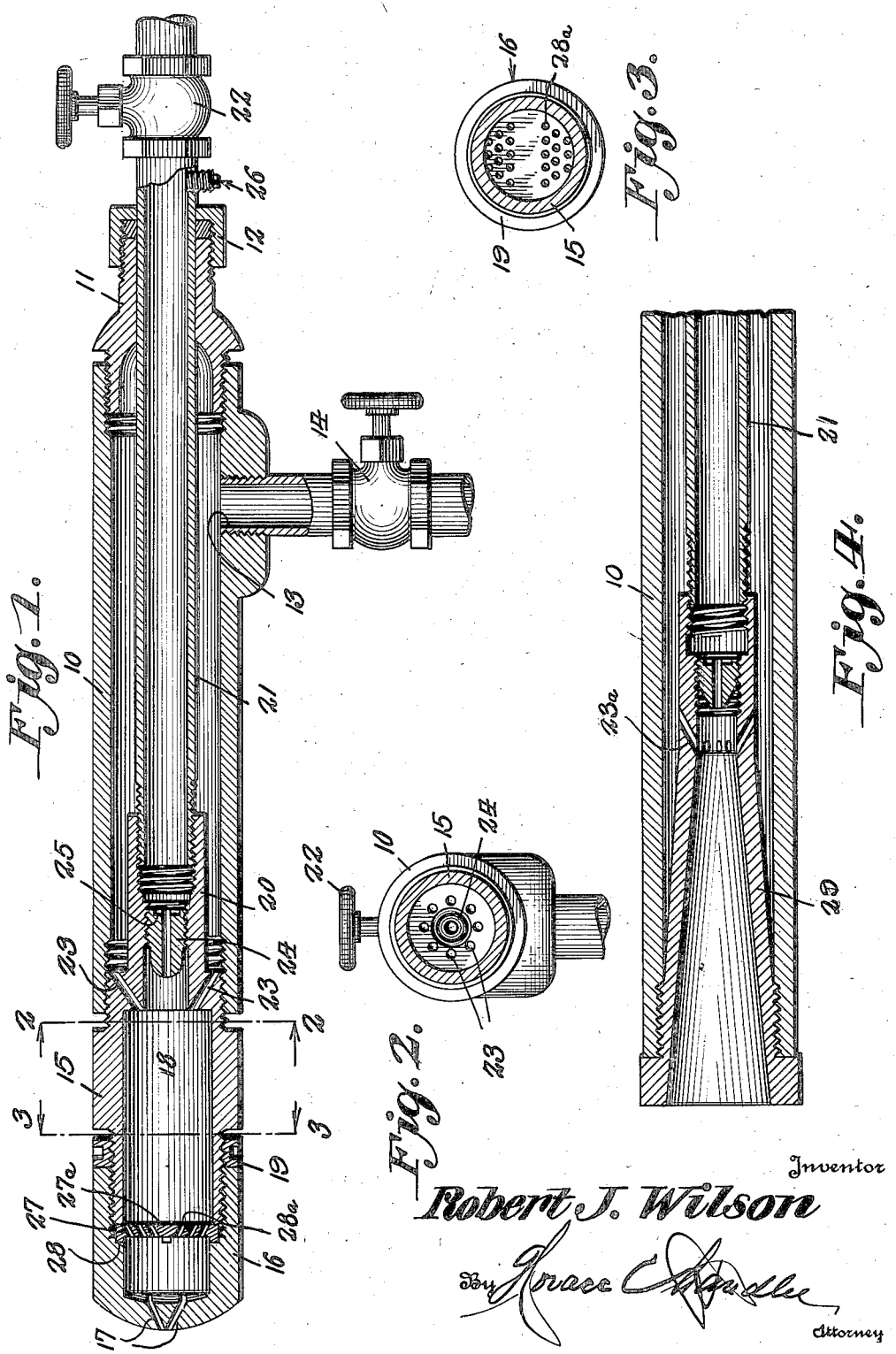

1,999,121

UNITED STATES PATENT OFFICE 1,999,121

OIL BURNER

Robert J. Wilson, Baton Rouge, La.

Application March 26, 1934, Serial No. 717,513

1 Claim. (Cl. 158—75)

This invention relates to new and useful improvements in burners, and particularly to oil burners wherein the oil is atomized and mixed with steam.

One object of the invention is to provide an oil burner, of this character, which will not carbonize, and which will not carbonize the furnace with which it is used.

Another object is to provide a device of this character wherein the oil is preheated, by the steam, before reaching the mixing chamber of the burner, thereby rendering the atomizing and mixing of the steam and oil more efficient.

Other objects and advantages will be apparent from the following description when taken in connection with the accompanying drawing.

In the drawing:

Figure 1 is a vertical longitudinal sectional view through a burner made in accordance with the present invention.

Figure 2 is a transverse sectional view on the line 2—2 of Figure 1.

Figure 3 is a transverse sectional view on the line 3—3 of Figure 1.

Figure 4 is a longitudinal sectional view through a modified form of burner which is particularly adapted for use with low pressure or gravity feed.

Referring particularly to the accompanying drawing, 10 is the casing or steam conduit of the burner, which has its opposite ends interiorly threaded, as shown. Threaded into one end of the casing 10 is one end of a tubular member 11, which has the stuffing-box 12 on its other end. In one side of the casing 10, adjacent said end, is an opening 13, through which steam enters said casing, and in said opening is mounted a pipe with the controlling valve 14.

In the other end of the casing 10 is threaded one end of a coupling member 15, and removably mounted on the other end of said member 15 is the burner tip 16, the outer end of which is provided with openings 17 for the discharge of the mixture of steam and oil, after having been thoroughly atomized and mixed in the mixing chamber 18, within the said coupling member 15. A lock nut 19 is engaged on the outer threaded end of the coupling member 15, inwardly of the burner tip, for locking said tip in proper position on said member. The inner end of said coupling member 15 is reduced in diameter, as indicated at 20, and extends into the said casing 10, where it is interiorly threaded to receive one end of the oil conducting tube 21, which tube extends longitudinally within said casing and passes outwardly through the before-mentioned stuffing-box 12.

On the last-named end of the oil conducting tube there is mounted a valve 22, for controlling the flow of oil through said tube. Formed in the coupling member 15 at the juncture of the body thereof, and the reduced portion, are the forwardly converging steam escape openings 23, which deliver steam to the mixing chamber, across the adjacent end of the bore of the reduced portion 20. Removably secured within the said end of the bore of the portion 20 is the oil discharge nozzle tip 24, which delivers a stream of oil into the mixing chamber 18. The tip 24 is provided with a notch or groove 25, for the reception of a screwdriver, whereby to permit easy removal of said tip, for replacement, cleaning, or repairs.

Disposed between the outer end of the coupling member 15, and the nozzle 16, and lying within said nozzle, is a disk 27, one face of which is provided with lugs 28 engaged in recesses in said nozzle. This disk is provided with transverse series of openings 28a, and a central transverse imperforate portion 27a, and it is the function of the before-mentioned lugs and recesses to maintain the disk in such position that the openings thereof are in parallel relation with the openings 17 of the nozzle, whereby to insure the proper flow of the mixture to said openings 17, from said openings 28a.

When low pressure or gravity feed is used, to drive the oil through the device, the form shown in Figure 4 is employed.

In the form shown in Figure 4 a conical member 29 is screwed into the outer end of the casing 10, and extends rearwardly into said casing where it receives the forward end of the oil conduit 21. In the smaller end of the member 29 is a burner tip, similar to the tip 24, and formed in said end, forwardly of said tip, is a circular series of inwardly and forwardly inclined steam openings 23a which discharge into the interior of the conical member. The forward or discharge end of the member 29 may be circular, flattened, or otherwise formed, as may be readily understood, without departing from the invention.

In the rear end portion of the oil conduit is a clean-out plug 26.

In the operation of the device, the operator opens the steam controlling valve 14, permitting steam to flow into the casing or steam conduit, around the oil conduit, for the purpose of heating the oil conduit. The oil controlling valve 22 is then opened to permit the oil to flow through the conduit and out of the tip 24, into the mixing chamber 18. At the same time the steam issues from the openings 23, across the adjacent end of the oil conduit, drawing the oil therefrom and producing atomization of said oil, also thoroughly mixing therewith. The mixture of the steam and oil then issues through the openings of the burner tip 16, where it is ignited by means of a torch, or other similar device, by the operator.

Attention is called to the fact that, by heating the oil at the time of burning thereof, none of the gases of said oil will be lost, and the oil will burn, at the tip, with a short, bright, and intense flame. After having installed and regulated the burner, the same will not require any great amount of attention. Furthermore, when the burner is to be cleaned, it is only necessary to blow steam therethrough. Oil of any specific gravity may be used in the burner, with equally successful results.

It will also be noted that the burner tip may be readily removed, and that other tips may be substituted therefor. Such other tips may have openings of different sizes, shapes, or arrangements, whereby to produce flames of different sizes and contours.

The oil nozzle tip 24 may also be readily replaced by tips having bores of different diameters.

What is claimed is:

A burner comprising an oil conduit, a steam conduit surrounding and spaced from the oil conduit, a hollow coupling member connected to one end of the steam conduit and having a reduced extension connected with the adjacent end of the oil conduit, said coupling member having passages connecting the steam conduit with the interior thereof, a nozzle removably mounted within the reduced portion of the coupling member for discharging oil into said member, a burner nozzle removably mounted on the outer end of the coupling member, said nozzle having an annular shoulder interiorly thereof, and a perforated disk clamped between the shoulder and an end of the coupling member.

ROBERT J. WILSON.